Figure 1:
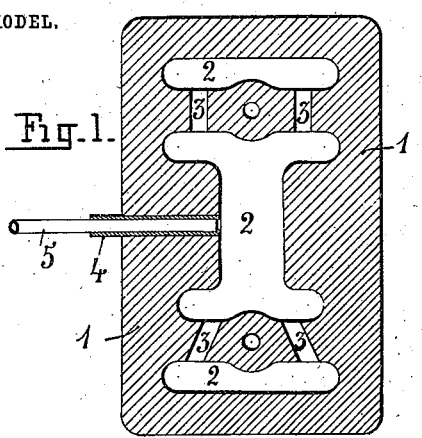

No. 729,108. PATENTED MAY 26, 1903.
A. TISSIER.
THERMO-ELECTRIC GENERATOR.
APPLICATION FILED NOV. 30, 1900.
NO MODEL.

Witnesses: Inventor
Albert Tissier
By his Attorney

No. 729,108. Patented May 26, 1903.

UNITED STATES PATENT OFFICE.

ALBERT TISSIER, OF PARIS, FRANCE.

THERMO-ELECTRIC GENERATOR.

SPECIFICATION forming part of Letters Patent No. 729,108, dated May 26, 1903.

Application filed November 30, 1900. Serial No. 38,232. (No model.)

*To all whom it may concern:*

Be it known that I, ALBERT TISSIER, a citizen of the Republic of France, residing at Paris, France, have invented certain new and useful Improvements in or Relating to Thermo-Electric Generators, (for which I have made application for Letters Patent in France on the 10th of October, 1900, No. 292,723; in Belgium on the 10th of October, 1900, No. 120,707; in Great Britain on the 10th of October, 1900, No. 18,036; in Spain on the 11th of October, 1900, No. 729, and in Italy on the 11th of October, 1900, No. 15,829,) of which the following is a specification.

The present invention relates to a new generator of electricity in which heat is transformed directly into electricity.

The generator consists, first, of a natural mineral of feldspar origin mineralogically composed of light particles of quartz, the particles of which are of the form of small rods or funicular tubes and is chemically composed of approximately 78.80 per cent. of silica, 1.44 per cent. of iron oxid, 6.96 per cent. of alumina, and 4.32 per cent. of magnesia, and, second, of zinc or metallic antimony or their oxids or their other chemical compounds. Such mineral is quarried at Antogay le Tillar par les Ormes, in the Department of Indre et Loire, France, and consists, mainly, of a mixture of more or less ferruginous clay and of very light particles of quartz, such as occur in infusorial earth.

The natural mineral and the chosen metal or its chemical compound are reduced to a fine powder, mixed and worked together with water, if required, until a homogeneous mass is obtained, which can then be formed into bricks, blocks, disks, or the like. The blocks are then dried and afterward placed in an electric furnace, such as is used in the production of calcium carbid, and here they are exposed to the temperature of the electric arc for several hours, so as to attain the temperature nearest to the fusion of the metal or of the oxid employed in order to obtain the molecular combination of the elements. The mineral thus fertilized or treated may be cut into bricks, cylinders, and other suitable shapes, which when heated at one end by any heat source remain cold or almost cold at their opposite ends. If each end is connected to a platinum wire or a terminal of a circuit, an electric current will flow through the circuit during all the time that one end of the body is exposed to heat. A mixture of fifty parts of the mineral and fifty parts of pulverulent zinc has given under the above conditions an electric generator from which very fine sparks have been obtained.

The accompanying drawings show a generator according to this invention.

Figure 2:
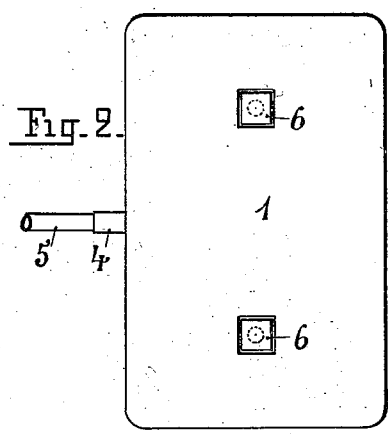
Figure 3:
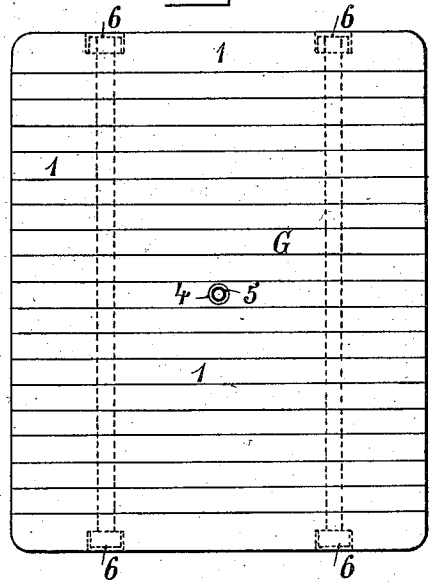
Figure 4:
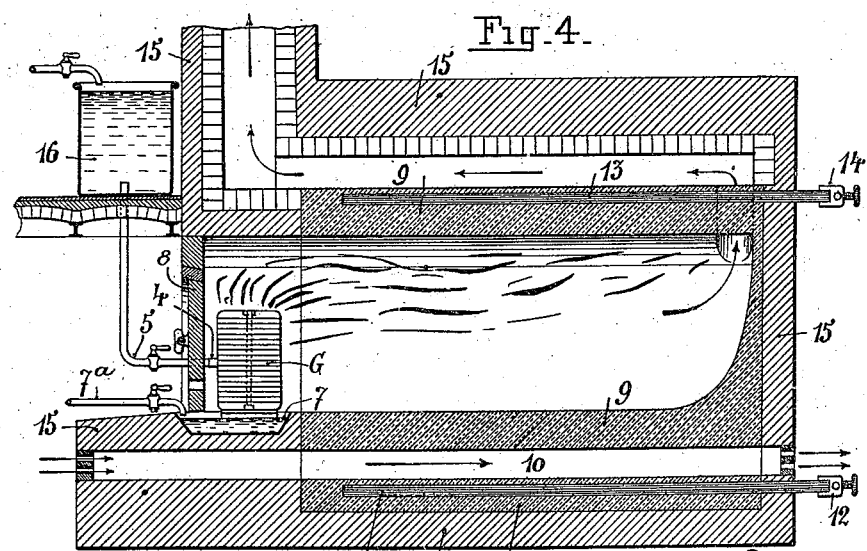

Figure 1, which is a cross-section of a block, shows one of the blocks 1, provided internally with hollows 2 and passages 3, connecting the hollows or openings together. A sleeve 4, of porcelain or other insulating refractory material, is arranged in a hole of this block. This sleeve is traversed by an iron tube 5, adapted to supply to the openings 2 the petroleum or other hydrocarbon used as the material for "animating" the said block. Fig. 2 represents one of the end blocks shown from the exterior. Fig. 3 represents the grouping of a series of these blocks superposed and united together by bolts 6, the heads of which lie in recesses in the end blocks. Fig. 4 represents in longitudinal vertical section a return-flame furnace adapted to be used in connection with the improved generator of electricity.

The heat-generator G of the type represented in Fig. 3 is placed above a basin 7, constantly supplied with water by a tube 7ª. This generator is placed near the door 8, closing a tunnel, the walls 9 of which are formed of materials of the same mineral substance. Beneath the bottom flues 10 are formed, through which the cold outer air passes. In the part of the bottom under these flues a bundle of metal wires 11 are arranged, these wires being good conductors of electricity and united outside the furnace by a terminal 12 for taking the current. Another bundle of wires 13, united by another terminal 14, is located in the central part of the thickness of the arch of the furnace. The other walls 15 of the furnace are constructed of insulating refractory material. The tube 5 communicates with an external reservoir 16, containing petroleum or other hydrocarbon, and terminates in the openings 2 in the generator G. The door 8 is provided with air-openings for keeping up combustion. The hydrocarbon-vapors coming from the reservoir 16 filter through the pores of the blocks 1 of the generator G and are ignited there, and the combustion animates the electric generator, and the flames coming in contact with the walls 9 transmit to them a high temperature, so that while the metallic bundle 11 remains at a low temperature the other bundle 13 readily attains a temperature of 1,000° and more, from which an electric current results, which shows itself between the terminals 14 and 12, the molecular combination realized by the mixture of the fusiform mineral with the closed metal (zinc, antimony, &c.) having set up in the mass a number of thermo-electric couples.

The water in the basin 7 serves to produce steam, which assists in bringing the element 13 to a high temperature. This high temperature is produced, on the one hand, by the combustion of the hydrocarbon supplied from the reservoir 15 and, on the other hand, by the decomposed vapor from the basin 7, which furnishes a supply of combustible hydrogen.

What I claim is—

1. The method of manufacturing a substance for use as a thermo-electric generator consisting in reducing to fine powder a natural quartz mineral the molecules of which are of a tubular or funicular formation, mixing powdered metallic zinc with the powdered quartz mineral and working the two together until a homogeneous mass is obtained, and then subjecting the mass to an intense heat as described.

2. A substance for use as a thermo-electric generator prepared from a mixture under intense heat, of a natural quartz mineral the molecules of which are of a tubular or funicular formation and composed approximately of 78.8 per cent. of silica, 1.44 per cent. of iron oxid, 6.96 per cent. of alumina and 4.32 per cent. of magnesia with finely-powdered metallic zinc, substantially as described.

3. The method of manufacturing a substance for use as a thermo-electric generator consisting in reducing to fine powder a natural quartz mineral the molecules of which are of a tubular or funicular formation, and composed approximately of 78.8 per cent. of silica, 1.44 per cent. of iron oxid, 6.96 per cent. of alumina, and 4.32 per cent. of magnesia, mixing said powdered mineral with approximately an equal quantity of powdered zinc or antimony, forming the mixture into blocks and exposing said blocks to the temperature of an electric furnace for several hours.

4. A thermo-electric generator consisting of a series of superposed hollow blocks made from the material described connected together by bolts the inner cavities of which blocks communicate by a tube with an external reservoir containing a suitable hydrocarbon, said generator being placed inside the door of a furnace-tunnel the exterior walls of which are formed of the same mineral substance while below cooled by an air-shaft, is arranged a bundle of metallic wires connected together outside by a terminal 12 while the furnace-arch contains another bundle of metallic wires joined to the other terminal for taking the current substantially as described.

In testimony whereof I have signed my name to this specification in the presence of two subscribing witnesses.

ALBERT TISSIER.

Witnesses:
ALBERT MAULVAULT,
EDWARD P. MACLEAN.